Figure 1:
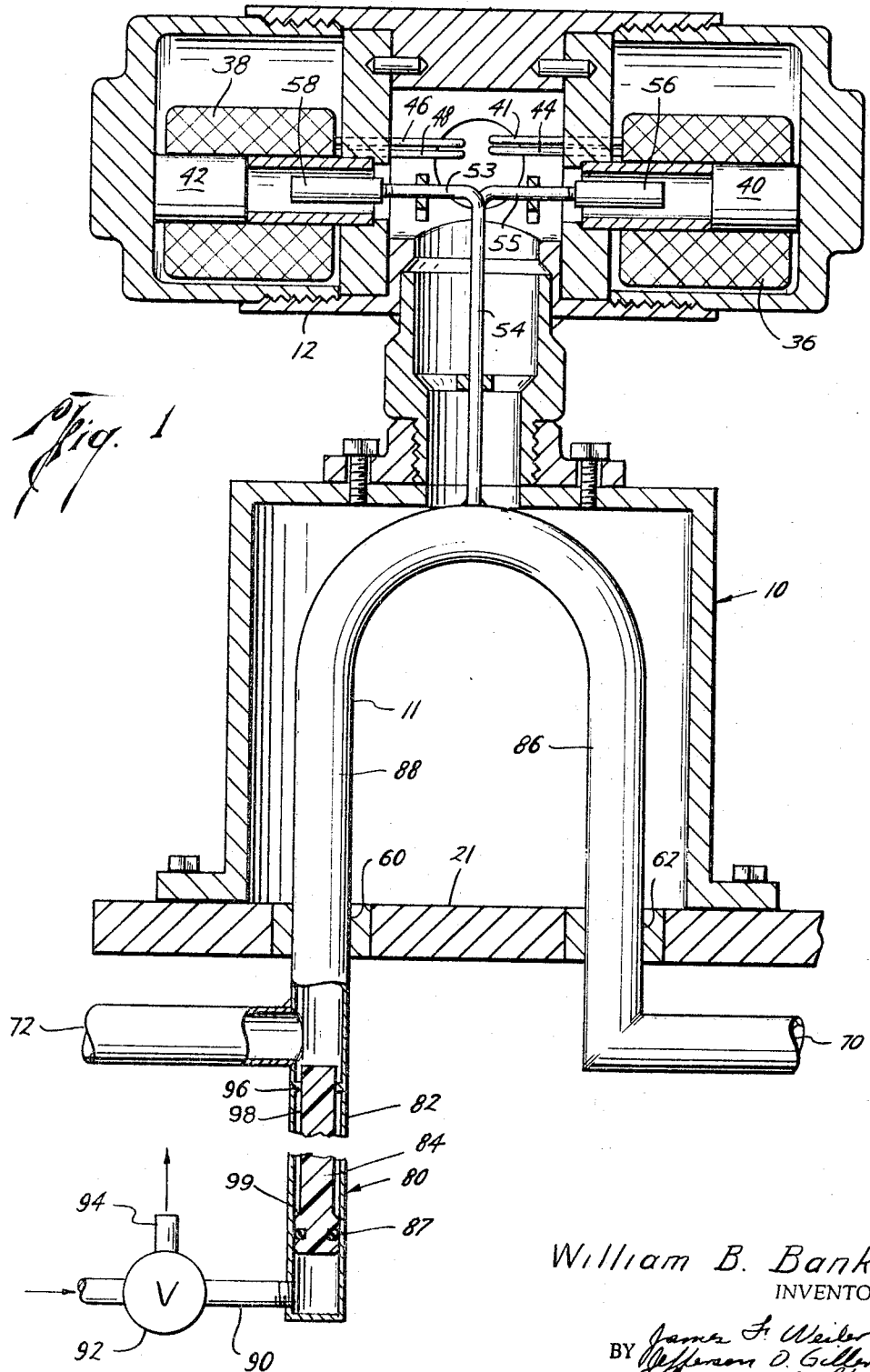

May 23, 1967 W. B. BANKS 3,320,791
APPARATUS FOR MEASURING DENSITY
Filed Sept. 24, 1964 3 Sheets-Sheet 1

William B. Banks
INVENTOR.

BY James F. Weiler
Jefferson D. Giller
William A. Stout
Paul L. DeVerter II
ATTORNEYS William B. Banks
INVENTOR.

BY
ATTORNEYS

United States Patent Office 3,320,791
Patented May 23, 1967

3,320,791
APPARATUS FOR MEASURING DENSITY
William B. Banks, Houston, Tex., assignor to Automation Products, Inc., Houston, Tex., a corporation of Texas
Filed Sept. 24, 1964, Ser. No. 398,980
11 Claims. (Cl. 73—32)

The present invention relates to an apparatus for measuring density, and more particularly to a calibrating and cleaning apparatus for use with an apparatus which measures the density of a flowing material.

The apparatus of the present invention is generally directed to providing a density meter having a hollow body for conducting material, and means for measuring the density of the material in the hollow body. As with any measuring instrument, there will be a certain amount of error or "drift" due to build up of deposits on the interior of the body, changes in temperature, etc. Therefore, a measuring apparatus must be periodically calibrated in order to give accurate readings. Conventionally, a density meter is calibrated by passing a reference sample of fluid through the meter of known density and then recalibrating the instrument. However, this requires extensive equipment to store and handle the reference fluid and may result in undesired contamination of the fluid being measured by the reference sample fluid. Furthermore, such a fluid reference sample calibration does not clean out the material deposits on the interior of the measuring apparatus, but merely calibrates the instrument to compensate for these deposits.

It is therefore a general object of the present invention to provide a calibrating apparatus for use with an apparatus for measuring density which will not contaminate the fluid being measured.

Yet a further object of the present invention is the provision of a calibrating apparatus for use with a density meter measuring flowing material which not only provides a noncontaminating reference sample, but which cleans the interior of the body of the density meter body which conducts the flowing material.

A still further object of the present invention is the provision of a calibrating apparatus for use with an apparatus for measuring density of a flowing material having a body for conducting the material to be measured by the provision of a housing in communication with the body, a calibrating rod positioned in the housing, and means for moving the rod into the body whereby the body may be cleaned and the density measuring apparatus calibrated.

Still a further object of the present invention is the provision of a density measuring apparatus for measuring the density of flowing materials which includes a tubular body for conducting the flowing material, and measuring means for weighing the tubular body and the material flowing therethrough which is an indication of the density of the flowing material by providing a housing in communication with the tubular body and having an internal diameter substantially equal to that of the body, a rod slidably positioned in the housing, and means for moving the rod into and out of the body whereby the measuring apparatus may be calibrated using the rod as a reference.

Yet a still further object of the present invention is the provision of a density measuring apparatus for measuring flowing materials which includes a U-shaped hollow body for conducting the flowing material, one of the legs of the U being an inlet and the other leg being an outlet, the legs being supported adjacent a node point of the natural resonant frequency of the body, vibration means connected to the body for vibrating the body and vibration detecting means connected to the body for detecting a change in the vibration of the body on a change in the density of the material flowing through the body, a housing aligned with the outlet leg of the body and having an internal diameter substantially equal to that of the U-shaped body, a flexible rod slidably positioned in the housing, and fluid means for moving the rod into and out of the U-shaped body whereby the rod will act as a reference sample for calibrating the apparatus and also will clean the interior of the body.

Figure 2:
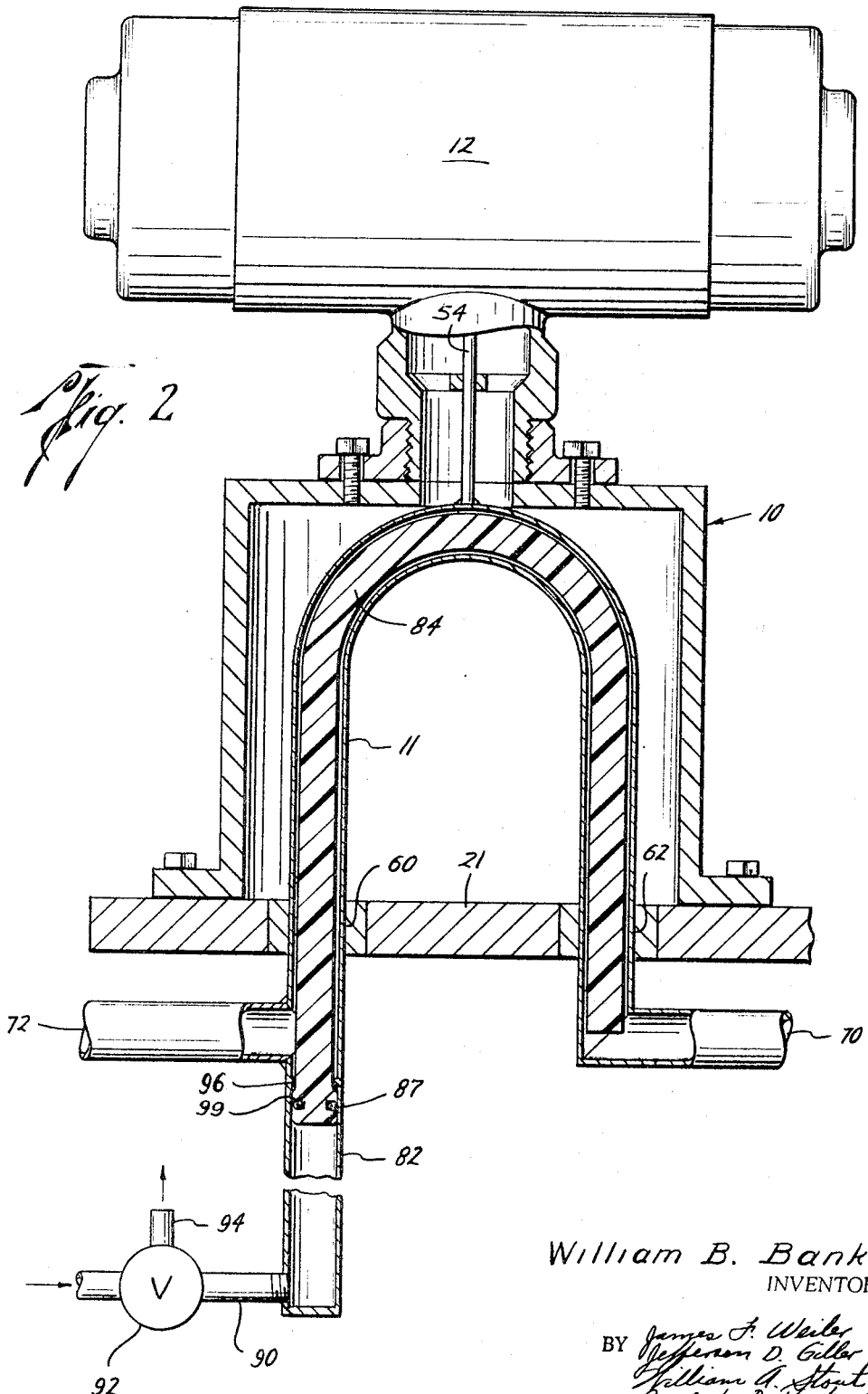
Figure 3:
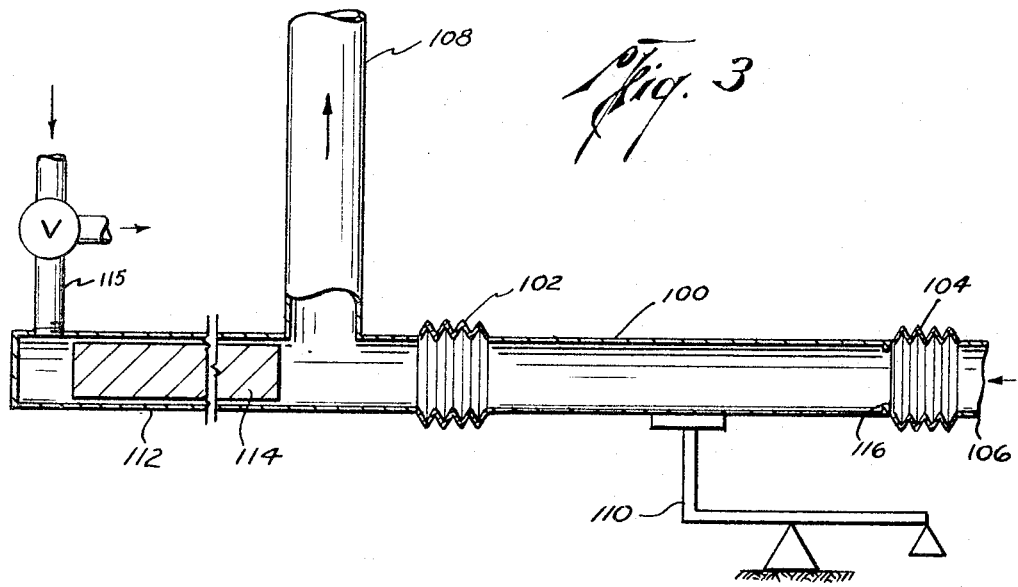
Figure 4:
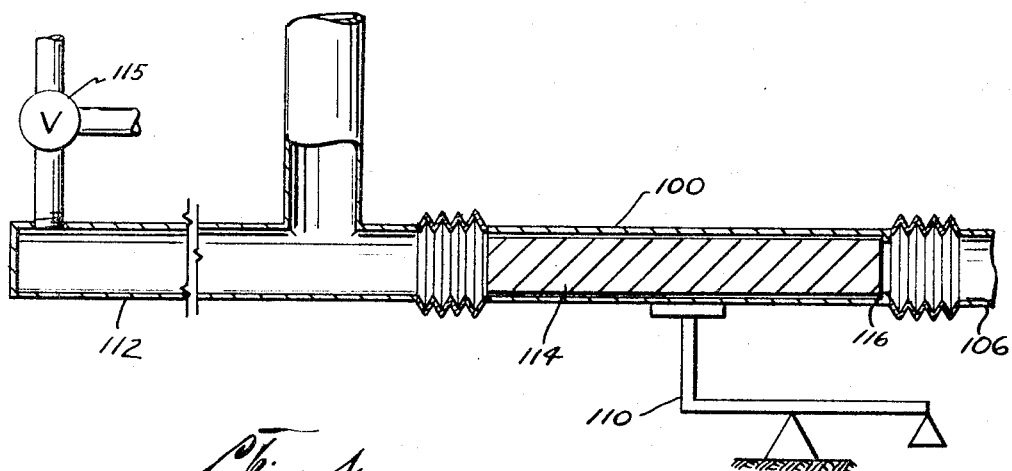

Other and further objects, features and advantages will be apparent from the following description of presently preferred embodiments of the invention, given for the purpose of disclosure, and taken in conjunction with the accompanying drawings, where like character references designate like parts throughout the several views, and where, FIGURE 1 is an elevational view, partly in section, illustrating one form of the present invention in which a U-shaped tubular body is being adapted to measure the density of fluid flowing therethrough with the calibrating apparatus in its retracted position, FIGURE 2 is an elevational view, partly in cross-section, illustrating the apparatus of FIGURE 1 wherein the calibrating rod is in position in the U-shaped body to act as a reference sample, FIGURE 3 is an elevational view, partly in cross-section, illustrating the use of the present invention with another type of density measuring apparatus wherein the calibrating rod is in a retracted position, and FIGURE 4 is an elongated view, partly in cross-section, illustrating the apparatus of FIGURE 3 wherein the calibrating rod is in position in the measuring body to act as a reference sample.

Referring now to the drawings, and particularly to FIGURE 1, the reference numeral 10 generally designates an apparatus according to the present invention for determining the density of a flowing material. The apparatus 10 generally includes as is more fully described in my copending patent application, Ser. No. 381,610, entitled Mass Presence Sensing Apparatus, filed July 6, 1964, means for vibrating, and means for detecting the amplitude of vibration of a hollow body 11 through which the material being measured is flowed. That is, the body 11 and the material flowing therethrough is vibrated and the vibration of the body is then measured which will be an indication of the value or change in the density of the flowing material.

Thus, the vibration means may be enclosed in a case 12 and generally includes an electromagnetic coil 36, a magnetic core 40, electrical connections 41 and 44 which supply electrical current from an external source to the electromagnetic coil 36 which sets up vibrations in a vibratory armature 56 which is connected to arm 55 of a rod 54 which is in turn connected to and vibrates the hollow U-shaped body 11 at the frequency of the applied external source.

The amplitude detecting means or generator assembly is also located in the case 12 and generally includes a permanent magnet 42, an electromagnetic coil 38 which is connected to electrical connections 46 and 48 which carry the signal generated in the detecting coil 38 to suitable electrical indicating or control means. Any suitable electric coil or detecting means may be used such as control relays or indicating volt meters (not shown) which can be used to control the density of the material or indicate the value or change in the density of the material being measured. Since these control or indicating means are conventional and do not constitute part of the present invention, no further description is deemed necessary. Rod 54 also includes an arm 53 which extends into the amplitude detecting assembly and supports a magnetic armature 58 at its end which vibrates and induces a voltage in coil 38 which is indicative of the amplitude of vibration of the body 11. While the rod 54, the vibration means, and the vibrating detecting means may be connected to the body 11 to vibrate the body 11 in any desired direction, it is shown in FIGURE 1 as being vibrated in a plane containing both legs of the U-shaped body 11 so as to vibrate the body 11, the material which it contains, and to detect the change in amplitude of vibration which occurs upon a change in density of the material passing through the body.

Thus, when the armature 56 is vibrated in response to an electrical signal applied to the electrical conductors 41 and 44, the body 11 and the material passing through the body will vibrate in accordance with that signal. Furthermore, the amplitude measuring armature 58 will also vibrate in response to the vibration of the body 11 and induce a signal in electrical conductors 46 and 48 which is proportional to the amplitude of vibrator of the body 11. To prevent blocking of the vibrations of the body 11, the body 11 is supported at points 60 and 62 by a suitable support structure 21 and the support points 60 and 62 are positioned adjacent the node points of the natural resonant frequency of the body 11. Thus, the density of the material flowing through an inlet 70, through the U-shaped body 11 and out an outlet 72 is continuously measured to note the value or change in value of the density of the flowing material.

However, as has previously been indicated, the density apparatus 10 is subject to error or "drift" due to changes in operating conditions such as temperature, and build up of deposits of material on the interior of the U-tube 11, etc. Therefore, it is desirable to periodically calibrate or zero the apparatus to provide accurate readings. Normally this is done by flowing a reference sample of fluid of known density through the apparatus 10 and calibrating the apparatus. However, in some cases it may not be desirable to allow the reference sample fluid to flow through the apparatus 10 and contaminate the normal fluid being measured. In addition, this procedure generally requires additional equipment and controls, and furthermore, it does nothing to clean the interior of the tube 11 of the deposits therein. The present invention is generally directed to providing a calibrating apparatus for use with a density measuring apparatus 10 which will overcome the disadvantages of using a fluid reference sample.

The calibrating apparatus of the present invention is generally designated by the reference numeral 80 and generally includes a housing 82, a calibration rod 84 slidably positioned in said housing, and includes means for moving the rod into and out of the body 11.

The U-shaped body 11 includes a leg 86 which receives the incoming fluid and a leg 88 from which the outgoing fluid is discharged. The housing 82 preferably has an internal diameter substantially equal to that of the U-shaped body and is preferably positioned axially aligned with the outlet leg 88 of the U-shaped body 11. The housing 82 while connected to the body 11 is connected out of the path of flow and thus does not interfere with the normal measuring operation of the apparatus 10. Similarly, the flexible rod 84, which is semirigid and may be of any suitable material such as plastic, neoprene or flexible metal is normally positioned in the housing 82 and thus does not interfere with the normal measuring operation of the apparatus 10.

While the flow of material through the U-shaped body 11 is stopped, the rod 84 may be moved into the body 11 easily because the U-tube has a uniform internal diameter, and a smooth regular shape. No portions of the body 11 will be subject to stress or distortion by the insertion of the semirigid tube 84. Furthermore, the insertion of the rod 84 into the interior of the tube 11 will act to scrape the interior walls of the tube 11 thereby cleaning them of undesired deposits of material. In addition, the rod 84, being of a known density acts as a reference sample while positioned in the tube 11 and the apparatus 10 may be conveniently and accurately calibrated.

Any suitable means for moving the rod 84 into the out of the interior of the U-tube may be used. For instance, a suitable O-ring seal 87 may be provided, if desired, although it is not necessary, adjacent one end of the rod 84 thereby acting as a piston in the housing 82. And a suitable fluid supply such as air may be admitted through conduit 90 into the housing 82 by the valve 92 behind the seal 87 to provide an actuating force to move the rod 84 into the U-tube 11. For simplicity, the valve 92 and the rear of the housing 82 may be vented to the atmosphere through valve exhaust 94 and the rod 84 move back into the housing 82 after calibration by the action of the normal flow of the fluid material through the U-shaped body 11.

In order to position the rod 84 in the U-tube 11 at the same position for each calibration a suitable stop lug 96 is provided in the housing 82 and a coacting slot 98 and stop shoulder 99 is provided on the flexible rod 84 thereby limiting and positioning the extended position of the rod in the U-shaped body 11. Furthermore, by having the stop means at the rear end of the flexible rod 84 there will be no compressive force applied on the rod as it is extended into the body 11 which might compress and change the density of the rod as it is extended.

Of course, the calibration apparatus of the present invention may be used to calibrate other types of density measuring apparatus than the apparatus of FIGURES 1 and 2. Referring now to FIGURES 3 and 4 an elongate tubular hollow body 100 is shown connected by a bellows 102 and 104 so as to be part of a fluid line having an inlet 106 and an outlet 108 thereby conducting a fluid to be measured. Any suitable weighing mechanism 110 may be utilized to weigh the tubular body 100 and the fluid flowing therein to provide an indication of the density of the flowing material. The calibration apparatus may be used with such a density apparatus wherein a housing 112 is aligned with the tubular body 100 and includes a calibration rod 114, and suitable means for moving the calibration rod 114 into and out of the tubular body 100. Thus similar to FIGURES 1 and 2 a valve 115 is provided connected by line 118 to the housing 112 to provide fluid pressure to move the calibration rod 114 into the tubular section 100 until it contacts and stops adjacent shoulder 116. The calibrating rod 114 may be again retracted into the housing 112 by the action of the flowing material through the body 100 from the inlet 106.

In use, and referring to FIGURES 1 and 2, the flexible rod 84 is normally retracted in the housing 82 as best seen in FIGURE 1 and therefore does not interfere with the flowing material to be measured which passes from inlet 70 through the legs 86 and 88 of the body 11 and out the outlet 72. However, when it is desired to recalibrate the apparatus 10, the flowing material is stopped, the valve 92 may be actuated to provide a force against the back end of the flexible rod 84 to move it into an etxended position into the body 11, as best seen in FIGURE 2. The stop lug 96 will coact with the shoulder 99 on the rod 84 thereby positioning the rod in the body 11 at the same predetermined calibration position for each calibration. Thus, with the rod 84 of a known density reference, the apparatus 10 may be suitably calibrated. In addition, it is noted that the passage of the rod 84 through the body 11 to clean any deposits on the interior walls of the body. After the calibration is performed, the flexible rod 84 may be suitably retracted into the housing 82 by the action of the material flow through the body 11 and the normal measurement of the flowing material may be continued.

Referring now to FIGURES 3 and 4, the calibrating apparatus of the present invention may be used with a weighing type density meter such as shown therein. Thus, the elongate tubular conductor 100 conducts the flowing material to be measured and the weighing means 110 thus measures the weight of the flowing material which is an indication of the density of the flowing material. The calibration rod 114 may be moved out of the housing 112 and into the tubular body 100 until the calibration rod is positioned in the tubular body 100 and adjacent the stop shoulder 116 as best seen in FIGURE 4. This can be done by opening valve 115 to provide fluid pressure on the back of calibration rod 114. The measuring means 110 may then be calibrated in the usual manner using the rod 114 as a reference. After calibration, the flowing material is again passed through the inlet 106 and the elongate tubular body 100 to move the calibration rod 114 back into the housing 112.

The present invention therefore is well adapted to carry out the objects and attain the ends and advantages mentioned as well as others inherent therein. Presently preferred embodiments of the invention have been given for the purpose of disclosure, and numerous changes in the details of construction and arrangement of parts will readily suggest themselves to those skilled in the art and which are encompassed within the spirit of the invention and the scope of the appended claims.

What is claimed is:

1. In combination with a density measuring apparatus having a conduit for flowing materials, a calibrating apparatus comprising,
 a housing in communication with the conduit,
 a calibration rod positioned in said housing, and
 means for moving the rod into the conduit whereby the measuring apparatus may be calibrated.

2. A calibration apparatus for use with a density measuring apparatus having a hollow body and which measures the density of flowing materials comprising,
 a housing aligned with the body and having an internal diameter substantially equal to that of the body,
 a calibration rod normally positoned in said housing,
 means for moving said rod between the housing and said body.

3. A calibration apparatus for calibrating a density measuring apparatus which has a hollow body for conducting and measuring the density of flowing material, comprising,
 a housing in communication with the body and having an internal diameter substantially equal to that of the body,
 a calibration rod slidable in and normally positioned in said housing,
 fluid means connected to said housing for moving the calibration rod into and out of the body.

4. A density measuring apparatus for flowing materials comprising,
 a hollow body having an inlet and an outlet for conducting said flowing material,
 means for weighing said body and the material flowing therein thereby measuring the density of the material,
 a housing aligned with the outlet of the body and having an internal diameter substantially equal to that of the body,
 a calibration rod slidable in and normally positioned in said housing, and
 fluid means for moving said rod between the housing and said body for cleaning and calibrating said apparatus.

5. In combination with a U-shaped density measuring apparatus for flowing materials which is suported by the legs of the U including means for vibrating the device and means for detecting a change in the vibration of the device, a calibrating apparatus comprising,
 a housing in communication with the U-shaped device,
 a flexible calibration rod positioned in said housing, and
 means for moving the rod into the U-shaped device whereby the device may be calibrated.

6. A calibrating device for use with a density measuring apparatus having a U-shaped body, the legs of the U being supported adjacent node points of the natural resonant frequency of the body, vibration means for vibrating the body, and amplitude vibration measuring means for detecting a change in the vibration of the body on a change of mass of material in the body comprising,
 a housing connected to one of the legs of the U-shaped body,
 a flexible elongate member normally positioned in said housing, and
 means for moving said member into the U-shaped body.

7. A calibrating apparatus for use with a density measuring apparatus having a U-shaped body, the legs of the U being supported adjacent the node points of the natural resonant frequency of the body, vibration means for virbrating the body, and amplitude vibration measuring means for detecting a change in the vibration of the body on a change of the density of the material flowing through the body comprising,
 a housing aligned with one of the legs of the U-shaped body, said body having an internal diameter substantially equal to that of the U-shaped body,
 a flexible calibration rod slidably positioned in said housing, and
 fluid means for moving said rod into and out of said U-shaped body.

8. A density measuring apparatus for flowing materials comprising,
 a U-shaped hollow body for conducting said flowing material, one of the legs of the U being an inlet and the other leg being an outlet,
 support means supporting each leg of said body adjacent a node point of the natural resonant frequency of the body,
 vibration means connected to the body for vibrating said body,
 vibration detection means connected to the body for detecting a change in the vibration of the body on a change in the density of the material flowing through the body,
 a housing aligned with the outlet leg of said body and having an internal diameter substantially equal to that of the U-shaped body,
 a flexible rod slidably positioned in said housing, and
 fluid means for moving said rod between the housing and said U-shaped body for cleaning and calibrating said apparatus.

9. The invention of claim 8 including stop means limiting the travel of said rod into said U-shaped body.

10. The invention of claim 8 wherein said fluid means includes,
 fluid means connected to the housing remote from the body for moving said rod into the U-shaped body, and
 the flow of the material passing through the U-shaped body for moving said rod out of said U-shaped body.

11. A density measuring apparatus for flowing materials comprising,
 a U-shaped hollow body for conducting said flowing material,
 support means supporting said body adjacent node points of the natural resonant frequency of the body,
 vibration means conected to the body for vibrating said body,
 vibration detecting means connected to the body for detecting a change in the vibration of the body on a change in the density of the material flowing through the body,
 a housing aligned with one of the legs of the U-shaped body and having an internal diameter substantially equal to that of the body, a flexible calibration rod slidably positioned in said housing, fluid means connected to said housing and adjacent the end of the rod remote from said body for moving said rod into said U-shaped body for cleaning and calibrating said apparatus, and stop means connected to said remote end of the rod thereby limiting the travel of said rod into the body and preventing said rod from being compressed.

References Cited by the Examiner

FOREIGN PATENTS 786,113   11/1957   England.

RICHARD C. QUEISSER, *Primary Examiner.*

J. D. SCHNEIDER, *Assistant Examiner.*